Figure 1:
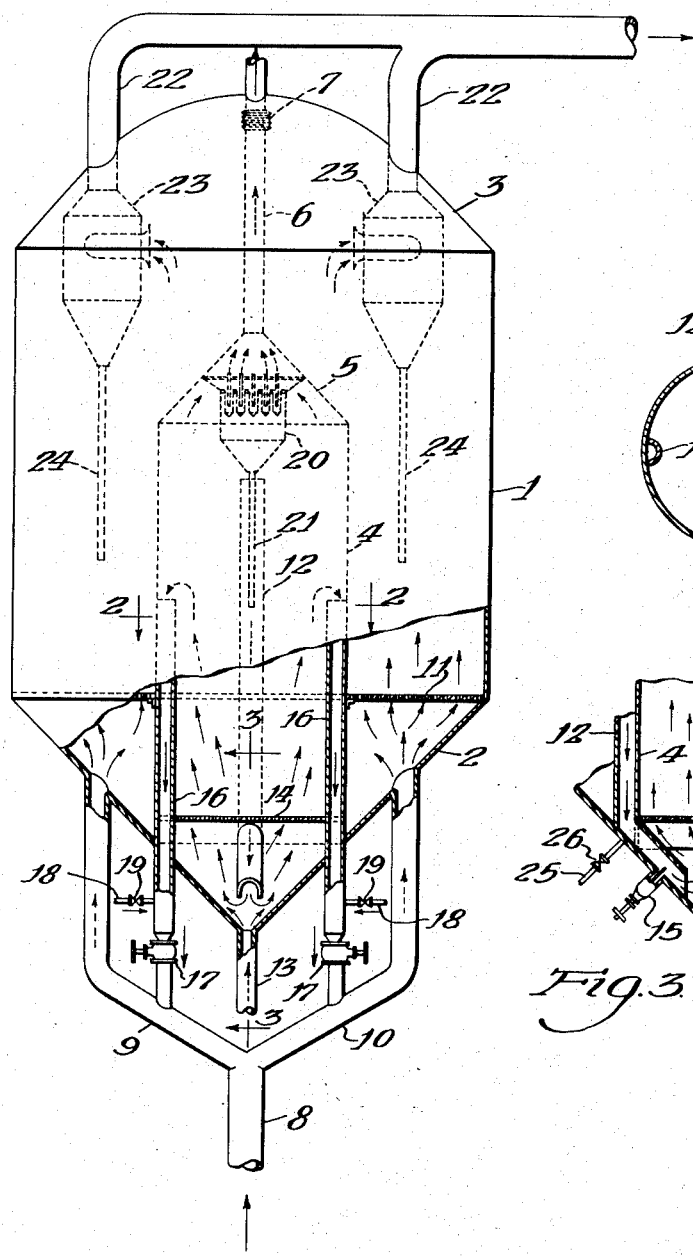

Aug. 26, 1952  J. H. STEPHENS  2,608,473
PARTICLE CONTACTING APPARATUS
Filed Aug. 28, 1948

Inventor:
John H. Stephens
By Maynard P. Venema
Attorney:
Philip J. Liggett
Agent Patented Aug. 26, 1952

2,608,473

UNITED STATES PATENT OFFICE 2,608,473

PARTICLE CONTACTING APPARATUS

John H. Stephens, Brookfield, Ill., assignor to Universal Oil Products Company, Chicago, Ill., a corporation of Delaware Application August 28, 1948, Serial No. 46,651

5 Claims. (Cl. 23—288)

This invention relates to an improved particle contacting unit having one contacting zone positioned internally within the other and providing thereby a compact efficiently operating arrangement whereby heat generated in one zone may at least partly conducted directly to the second zone. The apparatus is particularly adapted for use with finely divided catalytic materials which are contacted in fluidized beds and employed in conversion processes which have an endothermic reaction zone and an exothermic regenerating or reactivating zone. In such a process, it is desirable to have the endothermic reaction zone placed internally within the exothermic zone in order to receive and utilize the heat from the latter.

While the improved compact apparatus may be desirable in many processes using particles in two separate contact zones, it is specifically advantageous in fluidized catalytic conversion operations. For example, in the catalytic cracking of a hydrocarbonaceous stream in the usual fluidized operation, finely divided catalyst is contacted and maintained in a state of fluidization within the reaction zone by the vaporized hydrocarbon stream charged thereto and an endothermic reaction is effected, with heat being supplied primarily with the catalyst particles charged to the reaction zone. The used or contacted catalyst is continuously drawn from the reaction zone and passed to a regenerating zone and therein contacted with air or other free oxygen containing stream to effect the removal of carbonaceous contaminating matter so that the catalyst particles may be reused in the reaction zone. In a manner similar to the action within the conversion zone, the oxygen-containing stream serves to agitate and fluidize the contaminated particles while effecting the burning and reactivation of the catalyst material in an exothermic operation. The hot catalyst particles are continuously withdrawn from the regenerating zone and passed to the reaction zone to effect further conversion of the reactant stream. In the usual operation, it is also customary to strip and remove entrained and occluded vaporous and gaseous material from the contacted catalyst particles leaving the reaction zone. Therefore, a stripping zone is provided to contact the catalyst material with an inert stripping medium such as nitrogen, stream, flue gases, or the like, prior to charging the catalyst into the regenerating zone.

It is the principal object of the improved solid particle contacting unit of this invention to provide a compact apparatus arrangement and construction having one reaction chamber placed inside another contacting chamber, whereby heat may be transferred directly into the inner chamber through the wall thereof, as well as have heat carried thereto with the solid particles.

It is also an object of the invention to provide a unitary apparatus having the particle transfer ducts and stripping zones primarily within the interior of the unit, so that a minimum of piping and duct work is necessary and in order to effect a high temperature stripping operation.

Briefly, the improved unit of this invention comprises in combination, an external chamber, a confined inner reaction chamber spaced from the top and side walls of the external chamber and supported from the lower end thereof, inlet conduits connecting with the lower end of the external chamber and providing particle and fluid inlet means thereto, a fluid inlet to the lower end of the inner chamber, vapor outlets from the upper end of each of the chambers, particle transfer ducts extending from the interior of the inner chamber to the inlet conduits connecting with the external chamber, open-ended particle transfer ducts extending from the interior of the external chamber into the lower end of the inner chamber, flow control means in each of the transfer ducts from both the inner and outer chambers, and particle separating means connecting with the vapor outlets at the upper end of each of the chambers.

In many of the present apparatus arrangements for fluidized catalytic conversion units, the reaction and regenerating zones are placed in a side by side position, or alternately one of the chambers is elevated above the other, such that particle transfer conduits of considerable length are necessary to carry the solid material from one zone to another. It is also necessary to separately insulate each of the contacting chambers and the transfer conduits in order to reduce heat losses from the unit. The present apparatus arrangement, having one contacting zone positioned internally in the other, permits necessary endothermic heat to be transferred directly to that zone from the exothermic zone and insulating material on the inner zone to conserve heat is of course unnecessary. Some protection from the high temperature existing in the outer zone may, however, be desirable. Also, the improved chamber arrangement permits the use of shorter transfer conduits from one zone to the other and places them primarily internally within the apparatus so that insulation is unnecessary for a major portion of the conduit and duct work.

In a more specific embodiment of the unit, there is provided a vertically disposed external regenerating chamber, a confined inner reaction chamber positioned concentrically within the external chamber and supported from the lower end thereof, with the chambers having a common bottom head and with the top and wall of the inner chamber being spaced from the top and wall of the external chamber, a branched inlet conduit connecting with the lower end of the external chamber and providing a plural number of inlets thereto, a fluid inlet connecting centrally with the lower end of the inner reaction chamber, gas and vapor outlets from the upper end of each of the chambers, particle transfer ducts extending vertically downward from the interior of the inner chamber adjacent the wall thereof and extending therebelow to connect with the branched inlet conduit, with one transfer duct connecting with each branch of the inlet conduit, a plurality of open-ended particle transfer ducts extending from the interior of the external chamber into the lower end of the inner chamber, with each of the last-mentioned ducts being spaced around the wall of the inner chamber and extending into the latter along the bottom thereof to within a short distance of the fluid inlet, particle flow controlling means at the lower end of each of the transfer ducts which extend from each of the chambers, and particle separating means connecting with each of the vapor outlets at the upper end of each of the chambers.

In this latter embodiment, having particle transfer ducts which withdraw the used particles from the inner zone along the wall thereof, it may be seen that the withdrawal zone is in heat exchange relationship with the external chamber, so that the latter when housing an exothermic operation may provide heat to the withdrawal wells or ducts. This arrangement is of particular advantage in a hydrocarbon conversion process where the particles are contacted in the inner chamber and contaminated with a carbonaceous matter, and also tend to carry valuable vaporous reaction products with them in the withdrawal stream such that a stripping operation is desirable. It is generally known that a stripping operation is more efficient where the temperature is relatively high and permits the rapid vaporization and removal of the adsorbed and occluded vaporous products.

The symmetrical arrangement of the chambers, the fluid inlets, and the withdrawal conduits is also very desirable to insure the uniform contacting of the particles within each of the chambers and a resulting more efficient conversion of the reactant stream.

Reference to the accompanying drawing will serve to illustrate the arrangement and construction of a preferred embodiment of the improved apparatus, and the following description thereof will serve to point out additional advantageous features of the unit.

Figure 1 of the drawing is an elevational view, partially in section, indicating the general arrangement and construction of the improved unit.

Figure 2:
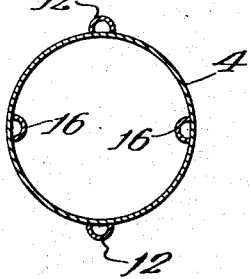

Figure 2 of the drawing is a partial plan view through the inner portion of the apparatus as indicated by the line 2—2 in Figure 1.

Figure 3:
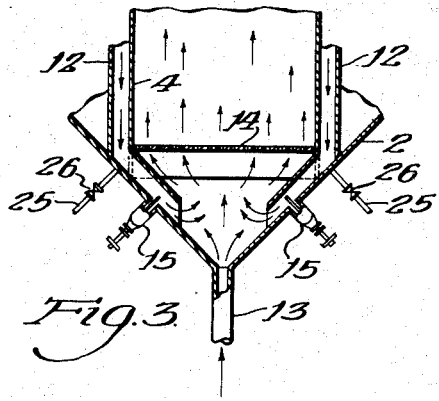

Figure 3 of the drawing is a partial elevational and sectional view of the lower end of the inner chamber, as indicated by line 3—3 in Figure 1 of the drawing.

Referring now to the drawing, the external chamber 1 is a relatively large cylindrical and vertically disposed vessel having a conical lower head 2 and an upper head 3. Extending upwardly from the center portion of the lower head 2 is an inner chamber 4, which forms an inner particle contacting zone and an outer contacting zone in the annular space within the outer vessel. The inner chamber 4 utilizes the lower portion of the head 2 to provide its lower closure, as well as to provide means for supporting itself symmetrically within the external chamber 1. The inner chamber 4 has an upper closure or head 5 and an outlet line 6 which extends vertically upward therefrom through the top head 3 of the outlet chamber. In order to accommodate differential linear expansions in the walls of the inner and outer chambers, an expansion joint 7 is placed in the line 6. While an expansion joint provides a desirable means for accommodating the differential expansions, other means such as a slip joint or packing gland arrangement may be employed and it is not intended to limit the construction at this zone to any one means.

At the lower end of the unit, a conduit 8 has branches 9 and 10 which connect with opposite sides of the lower head 2 of the external chamber 1, thus means is provided to pass a fluid stream of solid particles to the outer chamber. In a fluidized catalytic cracking operation, with the external chamber serving as a regenerating or reactivating zone, air or a free oxygen-containing stream is passed to conduit 8 and carried through the branch lines 9 and 10 to the regenerating zone where it serves to contact and fluidize catalyst particles in that zone. A perforated grid plate 11 in the lower portion of chamber 1 serves to distribute and equalize the flow of the particle and gaseous stream upwardly to the fluidized bed which is maintained in the external chamber 1 within the annular zone around the inner chamber 4. A pair of open-ended conduits or ducts 12 are placed adjacent the wall of the inner chamber 4 and on the outside thereof to receive the solid particles from the external zone and to discharge them into the lower portion of the inner zone. Figure 3 of the drawing indicates the manner by which the transfer ducts 12 pass through the lower end of the wall of chamber 4 and extend along the bottom head 2 to within a short distance of the center of the chamber. Thus, solid reactivated particles may be passed from the outer zone to the inner zone in a continuous manner.

At the lower end of the inner zone, a fluid inlet 13 provides means for charging a reactant stream into the inner chamber and into contact with the particles being discharged through the transfer ducts 12. The reactant stream thus serves to elevate and transport the solid particles upwardly through a distributing grid plate 14 into the lower and intermediate portions of the inner chamber 4 and to maintain a fluidized contacting bed for effecting the desired conversion. Also, at the lower end of each of the transfer ducts 12, there are placed suitable slide valves 15, or other flow controlling means that can be readily adjusted to regulate and control the flow of the solid material being passed from the external chamber of the inner chamber.

Within the inner chamber 4 and adjacent the wall thereof, there are placed a pair of particle withdrawal conduits or ducts 16 which serve to receive contacted particles from the inner reaction zone and carry them downwardly through an elongated stripping zone to the exterior inlet conduits 9 and 10. Slide valves 17 or other suitable particle flow controlling means are also placed at the lower end of each of the ducts 16. Thus, the flow of material from the inner contacting chamber passing to the conduits 9 and 10, and subsequently to the outer contacting zone, may be regulated and controlled by the control valves 17. At the lower end of each of the transfer conduits 16, there is provided a stripping fluid inlet line 18, with each having flow controlling valves 19, so that a stripping medium may be passed upwardly through each of the ducts countercurrently to the descending particle stream, whereby to effect a stripping and removal of adsorbed and occluded vaporous materials therefrom. Although not indicated in the drawing, each of the particle withdrawal ducts 12 and 16 may have slots or spaced openings along the length thereof, in order to provide means for accommodating varying fluidized bed levels within each zone, as well as means to withdraw all of the solid material from each contacting zone when the unit is being shut down.

A particle separator 20 is placed in the upper portion of the inner chamber 4 and is desirable to remove and retain entrained finely divided material which would otherwise be discharged through line 6 with the gaseous and vaporous reaction products. The separator may be of the usual centrifugal or cyclone type, or of the "multiclone" type and as a lower particle collecting hopper with a dip leg 21 which is suitable to return the recovered particles to the fluidized bed maintained within the contacting zone. The vapor and gas outlets 22 at the upper end of the external contacting chamber 1, also have suitable particle recovery units 23 connecting thereto, which in turn have particle return legs 24 extending downwardly therefrom into the external contacting zone, in order to return the recovered solid particles to the fluidized particle contacting bed which is maintained therein.

A stripping fluid inlet line 25, with a valve 26, is provided at the lower end of each of the particle transfer ducts 12 to permit the removal and stripping of volatile matter from the particle stream passing to the inner chamber. It is frequently found desirable to strip the regenerated catalyst particles in a catalytic conversion process. It is further contemplated that the present apparatus may be utilized in a process which has an exothermic conversion reaction, such that the reactant stream is passed to the outer chamber and the particles reactivated in the inner zone, in which case it may be found particularly desirable to use the elongated transfer ducts 12 as stripping zones.

In a fluidized operation such as the catalytic cracking of a hydrocarbonaceous stream, as mentioned hereinabove, the hydrocarbon stream charged through inlet 13 continuously contacts the catalyst particles within the inner chamber 4 in an endothermic reaction, with heat being supplied both by conduction through the wall of chamber 4 and by heat carried with the catalyst particles and being discharged into the inner zone by way of the particle transfer ducts 12. Used and contaminated catalyst particles are continuously withdrawn through each of the transfer ducts 16, continuously stripped with steam, or other inert medium, and subsequently transported to the exterior regenerating zone by means of an oxygen-containing stream entering conduit 8 and the branch inlet lines 9 and 10. The particles have the carbonaceous contaminating materials burned therefrom in chamber 1, in a fluidized bed maintained within an annular zone extending around the inner chamber 4. The burning and reactivation process provides a continuous exothermic operation, which as has been previously noted, passes heat to the inner chamber by conduction, and of course by virtue of the oxidation of carbonaceous material, elevates the temperature of the catalyst particles prior to their return to the reaction zone.

The embodiment which is illustrated, maintains the transfer ducts 12 on opposite sides of the inner chamber 4 and at right angles to the transfer ducts 16, which also oppose one another within the interior of the wall forming the inner chamber 4. This symmetrical arrangement is particularly desirable to permit the uniform withdrawal and introduction of the solid particles at each of the contacting zones. It is not intended, however, to limit the improved apparatus to the use of only two particle withdrawal ducts from each of the contacting zones, or to the use of only two inlet lines to the exterior zone, for obviously, additional conduits may be readily spaced in a symmetrical arrangement around the inner chamber 4 to provide a plural number of particle transfer conduits and to provide the desirable uniform contacting of particles and efficient operation of the unit.

The wall of the inner chamber 4 may be of an alloy metal, where the temperature requirements are such that ordinary carbon steel would be unsatisfactory. Alternately, in a low pressure operation, a ceramic or other refractory type of material may be utilized to form the wall of the inner chamber and to withstand the high temperature and erosive conditions.

I claim as my invention:

1. An apparatus of the class described comprising in combination a vertically disposed external regenerating chamber, a confined inner reaction chamber positioned concentrically within said external chamber and supported from the lower end thereof, said chambers having a common bottom head, a branched inlet conduit connecting with the lower end of said external chamber and providing a plurality of inlets thereto, a fluid inlet connecting centrally with the lower end of said inner reaction chamber, gas and vapor outlets from the upper end of each of said chambers, particle transfer ducts extending vertically downward from the interior of said inner chamber and connecting with said branched inlet conduit, with one transfer duct connecting with each branch of said inlet conduit, a plurality of open-ended particle transfer ducts extending from the interior of said external chamber into the lower end of said inner chamber, each of last said ducts comprising a vertical portion along the wall of said inner chamber and an angularly disposed portion extending along said common bottom head to within a short distance of said fluid inlet, flow control means in the lower end of each of said transfer ducts extending downwardly from each of said chambers, and particle separating means connecting with each of said vapor outlets at the upper end of each of said chambers.

2. The apparatus of claim 1 further characterized in that first said particle transfer ducts extend downwardly adjacent to and inside the wall of said inner chamber in indirect heat exchange relationship with the external regenerating chamber, and stripping fluid inlets connect with the lower portion of each of said particle transfer ducts at a point above said flow control means.

3. An apparatus of the class described comprising in combination a vertically disposed external regenerating chamber having a conical lower head, a confined inner reaction chamber positioned concentrically within said external chamber and supported from the lower end thereof, with the lower portion of said conical head of said external chamber forming the lower head of said inner chamber, two oppositely positioned inlet conduits connecting with the lower end of said external chamber, a fluid inlet connecting with the lower end of said inner chamber at the bottom of said conical head, vapor outlets from the upper end of each of said chambers, two oppositely positioned particle transfer ducts extending vertically downward from the interior of said inner chamber along the wall thereof and joining with said inlet conduits connecting with the lower end of said external chamber, stripping fluid inlets connecting to the lower portion of said transfer ducts, two open-ended particle transfer ducts extending from the interior of said external chamber vertically downward adjacent said inner chamber to the lower end thereof, last said ducts being placed at right angles with respect to first said ducts and extending into said inner chamber along the conical bottom thereof to within a short distance of said fluid inlet, particle flow controlling means at the lower end of each of said particle transfer ducts that extend downwardly from each of said chambers, and particle separating means connecting with said vapor outlets at the upper end of each of said chambers.

4. A contacting apparatus comprising a vertically disposed outer chamber, an inner chamber positioned concentrically within said outer chamber and having a common bottom head with the outer chamber, an inlet conduit connecting with the lower end of the outer chamber, a fluid inlet connecting centrally with the lower end of the inner chamber, a fluid outlet at the upper end of each of said chambers, a particle transfer duct extending vertically downward from the interior of the inner chamber and connecting with said inlet conduit, and an open-ended particle transfer duct extending from the interior of the outer chamber into the lower end of the inner chamber and comprising a vertical portion along the wall of the inner chamber and an angularly disposed portion extending along said common bottom head to within a short distance of said fluid inlet.

5. An apparatus of the class described comprising in combination a vertically disposed external regenerating chamber having a conical lower head, a confined inner reaction chamber positioned concentrically within said external chamber and supported from the lower end thereof, with the lower portion of said conical head of said external chamber forming the lower head of said inner chamber, an inlet conduit connecting with the lower end of the external chamber, a fluid inlet connecting centrally with the lower end of the inner chamber, a fluid outlet at the upper end of each of said chambers, a particle transfer duct extending vertically downward from the interior of the inner chamber along the wall thereof and joining with said inlet conduit, and an open-ended particle transfer duct extending from the interior of said external chamber vertically downward adjacent said inner chamber to the lower end thereof and extending into said inner chamber along the conical bottom thereof to within a short distance of said fluid inlet.

JOHN H. STEPHENS.

REFERENCES CITED

The following references are of record in the file of this patent:

UNITED STATES PATENTS

| Number | Name | Date |
|---|---|---|
| 1,209,258 | Bradley | Dec. 19, 1916 |
| 2,353,731 | Kanhofer | July 18, 1944 |
| 2,428,872 | Gunness | Oct. 14, 1947 |
| 2,439,582 | Scheineman | Apr. 13, 1948 |
| 2,514,288 | Nicholson | July 4, 1950 |